(12) United States Patent
Liu et al.

(10) Patent No.: US 10,824,410 B2
(45) Date of Patent: Nov. 3, 2020

(54) METHOD AND EQUIPMENT FOR EXECUTING A FILE (71) Applicant: Beijing Xiaomi Mobile Software Co., Ltd., Haidian District, Beijing (CN)

(72) Inventors: Lvping Liu, Beijing (CN); Minghao Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 274 days.

(21) Appl. No.: 15/820,740

(22) Filed: Nov. 22, 2017

(65) Prior Publication Data

US 2018/0143817 A1  May 24, 2018

(30) Foreign Application Priority Data

Nov. 23, 2016  (CN) .......................... 2016 1 1046513

(51) Int. Cl.
*G06F 8/61* (2018.01)
*G06F 8/41* (2018.01)
*G06F 9/4401* (2018.01)

(52) U.S. Cl.
CPC .................. *G06F 8/61* (2013.01); *G06F 8/41* (2013.01); *G06F 8/47* (2013.01); *G06F 9/4401* (2013.01); *G06F 9/4406* (2013.01)

(58) Field of Classification Search
CPC ........ G06F 8/61; G06F 9/4401; G06F 9/4406; G06F 8/41; G06F 8/47
See application file for complete search history.

(56) References Cited

U.S. PATENT DOCUMENTS

| 8,732,690 B1* | 5/2014 | Memmott ................. G06F 8/61 717/174 |
| 9,183,020 B1 | 11/2015 | De Icaza |
| 2005/0097534 A1* | 5/2005 | Clement ................. G06F 8/443 717/148 |

(Continued)

FOREIGN PATENT DOCUMENTS

| CN | 103699398 A | 4/2014 |
| CN | 105528229 A | 4/2016 |

(Continued)

OTHER PUBLICATIONS

Supplementary European Search Report in EP Application No. 17203348.2, dated Apr. 17, 2018, 9 pages.

(Continued)

*Primary Examiner* — Wei Y Zhen
*Assistant Examiner* — Amir Soltanzadeh
(74) *Attorney, Agent, or Firm* — Arch & Lake LLP (57) ABSTRACT

The present disclosure relates to the field of computer technology, and in particular to a method and device for executing a file of a third-party Application (APP) preinstalled in a terminal. The method includes that: before a first boot-up of the terminal is performed, compiling a byte-code file of the third-party APP preinstalled in the terminal using a compiling device to acquire a machine-code file; upon a request to run the third-party APP, extracting a machine-code file of the third-party APP from a data partition of the terminal; and executing the machine-code file to respond to the request to run the third-party APP.

14 Claims, 8 Drawing Sheets

(56) References Cited

U.S. PATENT DOCUMENTS

| | | | | |
|---|---|---|---|---|
| 2005/0136939 A1* | 6/2005 | Mountain | ............ | H04W 8/245 455/453 |
| 2006/0085685 A1* | 4/2006 | Cheston | .................. | G06F 8/60 714/38.13 |
| 2016/0132303 A1* | 5/2016 | de Icaza | ................ | G06F 8/447 717/146 |
| 2017/0131981 A1 | 5/2017 | De Lcaza | | |
| 2017/0269950 A1* | 9/2017 | Lu | ............................ | G06F 8/41 |

FOREIGN PATENT DOCUMENTS

| | | | |
|---|---|---|---|
| CN | 105677335 A | 6/2016 | |
| EP | 1082652 | 3/2001 | |
| WO | 9961983 A2 | 12/1999 | |

OTHER PUBLICATIONS

First Office Action of the Chinese Application No. 201611046513.1, dated Jun. 6, 2019 with English translation (22p).

\* cited by examiner

METHOD AND EQUIPMENT FOR EXECUTING A FILE

CROSS-REFERENCE TO RELATED APPLICATIONS

This application claims priority to Chinese patent application 201611046513.1 filed on Nov. 23, 2016, the entire content of which is incorporated herein by reference.

TECHNICAL FIELD

The present disclosure generally relates to the field of computer technology, and in particular to a method and equipment for executing a file.

BACKGROUND

With continuous development of mobile technology, many manufacturers may preinstall a large number of third-party Applications (APPs) in a terminal.

A terminal may have to generate machine-code files of third-party APPs that are preinstalled in the terminal by compiling the byte-code files of the third-party APPs at the first boot-up of the terminal. The compilation may take time and slow down the first boot-up of the terminal.

SUMMARY

The present disclosure provides a method, a device and a non-transitory computer readable medium for executing a file.

According to a first aspect herein, a method for executing a file of a third-party Application (APP) preinstalled in a terminal is provided. The method may include: before a first boot-up of the terminal is performed, compiling a byte-code file of the third-party APP preinstalled in the terminal using a compiling device to acquire a machine-code file; upon a request to run the third-party APP, extracting a machine-code file of the third-party APP from a data partition of the terminal; and executing the machine-code file to respond to the request to run the third-party APP.

According to a second aspect herein, a device for executing a file of a third-party Application (APP) preinstalled in a terminal is provided. The device may include: a processor; and a memory configured for storing an instruction that is executable by the processor, wherein the processor may be configured for: before a first boot-up of the terminal is performed, compiling a byte-code file of the third-party APP preinstalled in the terminal using a compiling device to acquire a machine-code file; upon a request to run the third-party APP, extracting a machine-code file of the third-party APP from a data partition of the terminal; and executing the machine-code file to respond to the request to run the third-party APP.

According to a third aspect herein, a non-transitory computer-readable storage medium having stored therein instructions is provided. The instructions, when executed by a processor, may cause the processor to perform executing a file of a third-party Application (APP) preinstalled in a terminal, where executing the file: before a first boot-up of the terminal is performed, compiling a byte-code file of the third-party APP preinstalled in the terminal using a compiling device to acquire a machine-code file; upon a request to run the third-party APP, extracting a machine-code file of the third-party APP from a data partition of the terminal; and executing the machine-code file to respond to the request to run the third-party APP.

Note that the above general descriptions and detailed description below are only exemplary and are not intended to limit the present disclosure.

BRIEF DESCRIPTION OF THE DRAWINGS

Drawings herein are introduced briefly for clearer illustration of a technical solution herein. Note that the drawings described below refer merely to some examples herein. For those skilled in the art, other drawings may be obtained according to the drawings herein without creative effort.

DETAILED DESCRIPTION

Exemplary implementation modes will be elaborated below with reference to the accompanying drawings. However, the exemplary implementation modes may take on multiple forms, and should not be taken as being limited to examples illustrated herein. Instead, by providing such implementation modes, examples herein may become more comprehensive and complete, and comprehensive concept of the exemplary implementation modes may be delivered to those skilled in the art. The accompanying drawings are but diagrams of examples herein, and may not be drawn to scale. Same reference signs in the drawings represent the same or similar parts, so that description of them will not be repeated. Implementations in the following exemplary examples do not represent all implementations according to the present disclosure. On the contrary, they are merely examples of equipment and methods according to some aspects of the disclosure as recited in the appended claims.

A term used in an example herein is merely for describing the example instead of limiting the present disclosure. A singular form "a" and "the" used in an example herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an example herein to describe various kinds of information, such information should not be limited to such a term. Such a term is merely for distinguishing information of the same type. For example, without departing from the scope of the examples herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of examples herein. However, those skilled in the art know that the technical solutions of examples herein may be carried out without one or more of the details; alternatively, another method, component, device, step, etc. may be adopted. Under other conditions, no detail of a known structure, method, device, implementation, material or operation may be shown or described to avoid obscuring aspects of examples herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

To clearly show a technical problem to be solved, a technical solution, and beneficial effects herein, examples herein are further elaborated below with reference to the drawings.

Figure 1A:
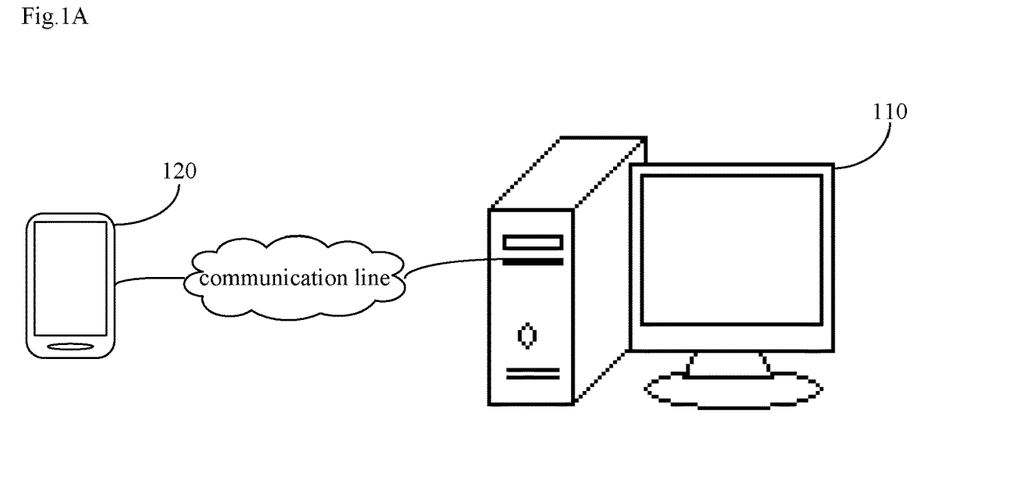
FIG. 1A is a diagram of an environment for implementing a method for executing a file according to an example herein.

FIG. 1A is a diagram of an environment for implementing a method for executing a file according to an example herein. The environment may include a compiling device 110 and at least one terminal 120.

The compiling device 110 may be a computer. The terminal 120 may be a smart phone, a computer, a multimedia player, an electronic reader, wearable equipment, and the like. A connection between the compiling device 110 and the terminal 120 may be established through a communication line. The communication line may be a Universal Serial Bus (USB). The compiling device 110 may operate a system file in the terminal 120. The system file may include a file related to a third-party APP. It is possible that the communication between the compiling device 110 and the terminal 120 is via a wireless communication method.

Figure 1B:
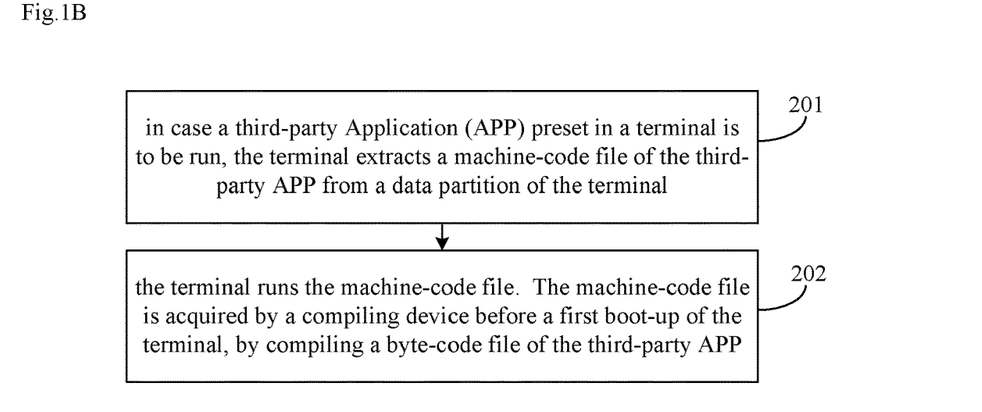
FIG. 1B is a flowchart of a method for executing a file according to an example herein.

FIG. 1B is a flowchart of a method for executing a file according to an example herein. The method may apply to the terminal 120 shown in FIG. 1A. The method includes steps as follows.

In step 201, in case a third-party Application (APP) preinstalled in a terminal is to be run, the terminal extracts a machine-code file of the third-party APP from a data partition of the terminal.

The machine-code file may be a binary file. The machine-code file may be executed directly by the terminal when running the third-party APP.

In step 202, the terminal runs the machine-code file. The machine-code file is acquired by a compiling device before a first boot-up of the terminal is performed, and by compiling a byte-code file of the third-party APP. The compiling device may compile the byte-code file to the machine-code file and store the compiled machine-code file before the first boot-up of the terminal is performed. The compiling device may perform such compilation before or after the third-party APP is preinstalled on the terminal. The machine-code file may be stored in a data partition of the terminal.

The compiling device may be a computer. The byte-code file may also be a binary file. The byte-code file may not be executed directly by the terminal. The byte-code file may be executed by the terminal only after being compiled into the machine-code file.

To sum up, with the method for executing a file according to an example herein, to run a preinstalled third-party APP, a machine-code file of the third-party APP compiled before a first boot-up of a terminal may be extracted from a data partition. As such, a duration of the first boot-up of the terminal may be reduced, and the first boot-up of the terminal may be speeded up.

Figure 1C:
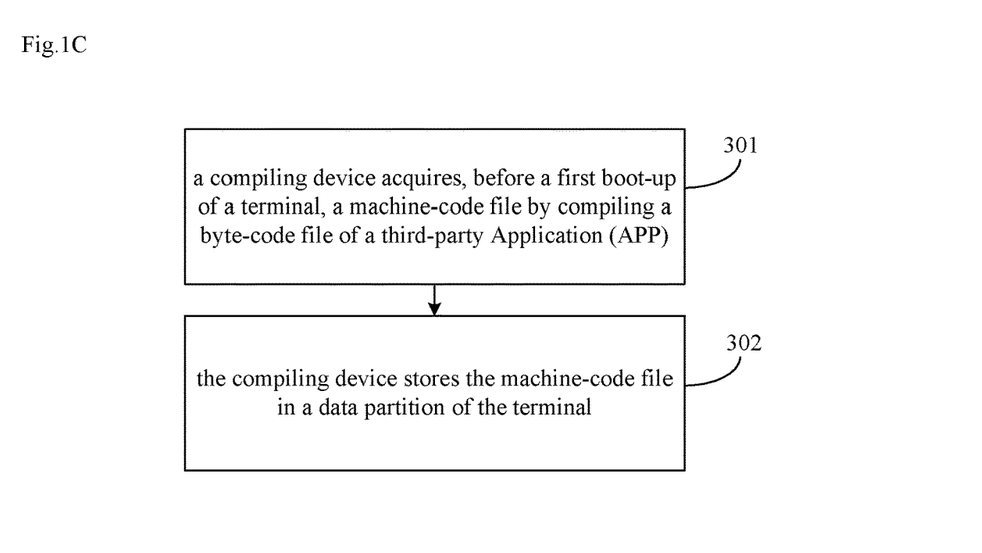
FIG. 1C is a flowchart of a method for executing a file according to another example herein.

FIG. 1C is a flowchart of a method for executing a file according to an example herein. The method may apply to the compiling device 110 shown in FIG. 1A. The method includes steps as follows.

In step 301, a compiling device acquires, before a first boot-up of a terminal, a machine-code file by compiling a byte-code file of a third-party Application (APP).

In step 302, the compiling device stores the machine-code file in a data partition of the terminal.

To sum up, with the method for executing a file according to another example herein, by acquiring a machine-code file through compiling a byte-code file of a third-party APP before a first boot-up of a terminal is performed, a step of compiling the byte-code file into the machine-code file may be skipped during the first boot-up of the terminal. Thus, a duration of the first boot-up of the terminal may be reduced, and the first boot-up of the terminal may be speeded up.

Figure 2A:
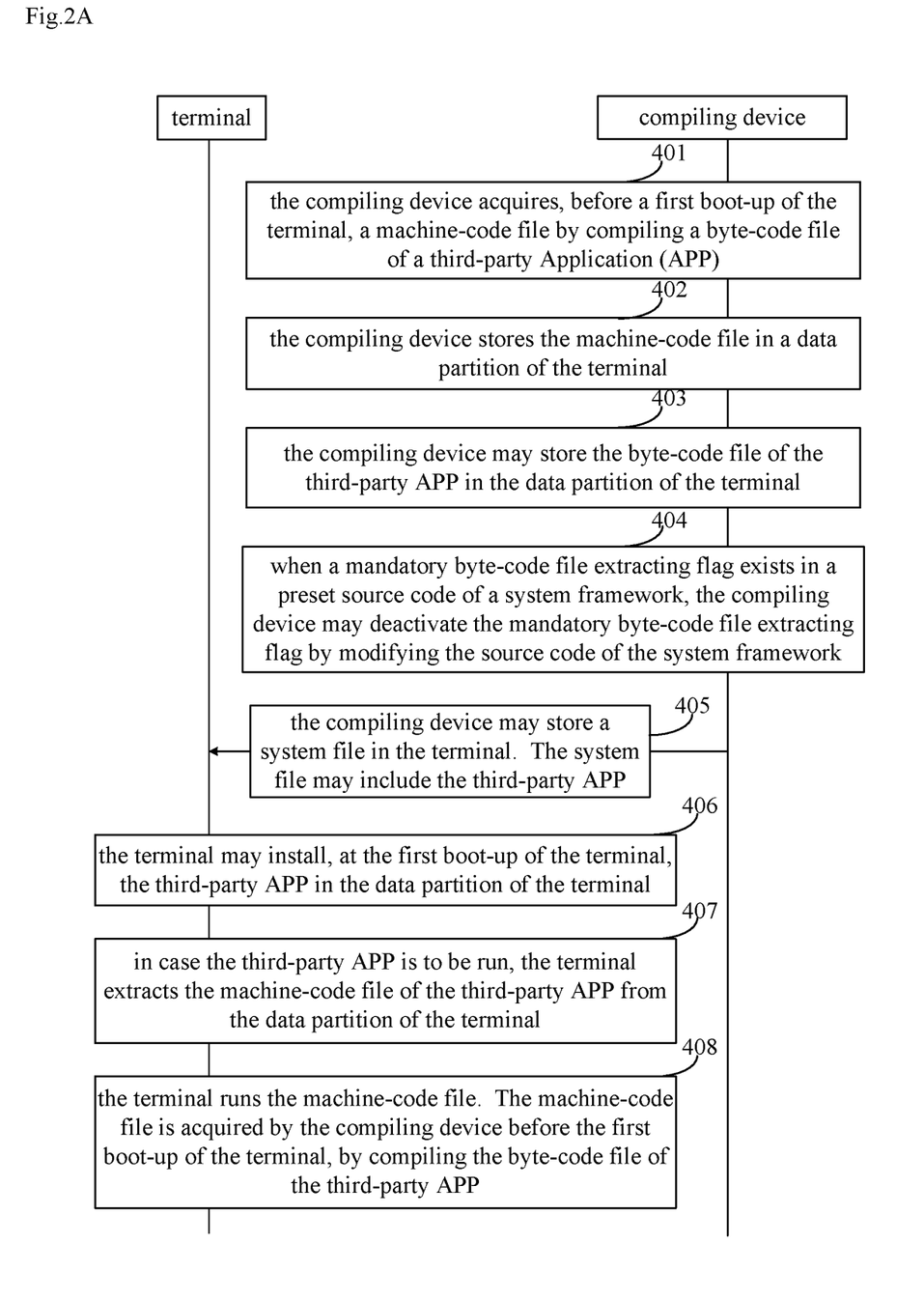
FIG. 2A is a flowchart of a method for executing a file according to a further example herein.

FIG. 2A is a flowchart of a method for executing a file according to a further example herein. The method may include steps as follows.

In step 401, a compiling device acquires, before performing a first boot-up of a terminal, a machine-code file by compiling a byte-code file of a third-party Application (APP).

Figure 2B:
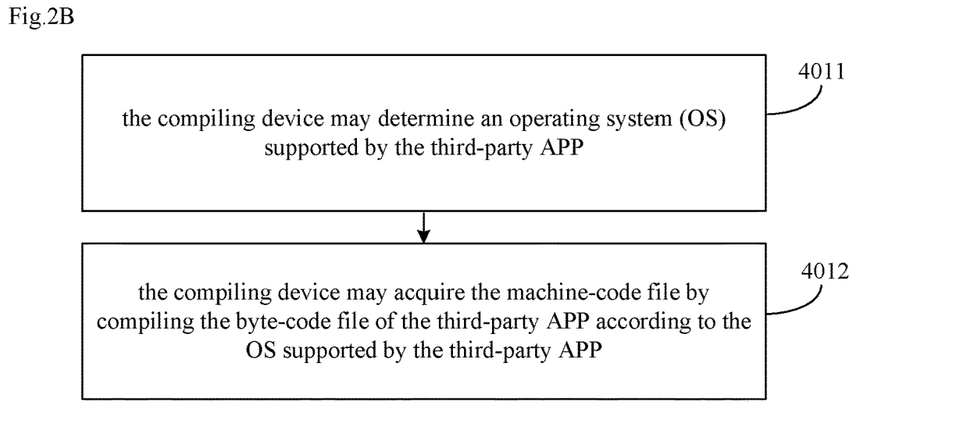
FIG. 2B is a flowchart of a method for compiling a byte-code file according to an example herein.

Optionally, as shown in FIG. 2B, step 401 may include steps as follows.

In step 4011, the compiling device may determine an operating system (OS) supported by the third-party APP.

The OS supported by the third-party APP may include a 32-bit OS and a 64-bit OS. In general, if the third-party APP supports the 32-bit OS, the third-party APP may be run on a terminal carrying the 32-bit OS. Due to downward compatibility of an OS in general, the third-party APP may also be run on a terminal carrying the 64-bit OS. If the third-party APP supports the 64-bit OS, the third-party APP may be run on a terminal carrying the 64-bit OS and may not be run on a terminal operated under the 32-bit OS.

When the third-party APP does not match an OS carried by a terminal, such as when a third-party APP A supporting the 64-bit OS is installed on a terminal carrying the 32-bit OS, the third-party APP A may not be run normally. To avoid such a runtime abnormality, an OS supported by the third-party APP has to be determined.

Optionally, step 4011 may include further steps as follows.

In step 4011*a*, the compiling device may detect whether an unzipped installation package corresponding to the third-party APP includes a directory for the 32-bit OS and whether the unzipped installation package corresponding to the third-party APP includes a directory for the 64-bit OS.

Optionally, an installation package file of the third-party APP may be unzipped through an unzip command. It may then be detected whether a library (lib for short) file in the unzipped installation package file includes a directory "armeabi" (i.e., the directory for the 32-bit OS) and a directory "arm64" (i.e., the directory for the 64-bit OS).

In step 4011*b*, when the unzipped installation package includes both the directory for the 32-bit OS and the directory for the 64-bit OS, the compiling device may determine that the third-party APP supports both the 32-bit OS and the 64-bit OS and may be executed under both the 32-bit OS and the 64-bit OS.

For example, a third-party APP B may be preinstalled in a data partition. An installation package file of the third-party APP B may be unzipped. It may be detected that a lib file in the unzipped installation package file of the third-party APP B includes both a directory "armeabi" and a directory "arm64", namely, both the directory for the 32-bit OS and the directory for the 64-bit OS. The compiling device may then determine that the third-party APP B supports both the 32-bit OS and the 64-bit OS. The unzipped operation may be performed by the compiling device or other equipment.

In step 4011*c*, when the unzipped installation package includes the directory for the 32-bit OS and does not include the directory for the 64-bit OS, the compiling device may determine that the third-party APP supports the 32-bit OS and does not support the 64-bit OS.

For example, a third-party APP C may be preinstalled in the data partition. An installation package file of the third-party APP C may be unzipped. It may be detected that a lib file in the unzipped installation package file of the third-party APP C includes a directory "armeabi", namely, a directory for the 32-bit OS, and does not include a directory "arm64", namely, a directory for the 64-bit OS. The compiling device may then determine that the third-party APP C supports the 32-bit OS and does not support the 64-bit OS.

In step 4011*d*, when the unzipped installation package includes the directory for the 64-bit OS and does not include the directory for the 32-bit OS, the compiling device may determine that the third-party APP supports the 64-bit OS and does not support the 32-bit OS.

For example, a third-party APP D may be preinstalled in the data partition. An installation package file of the third-party APP D may be unzipped. It may be detected that a lib file in the unzipped installation package file of the third-party APP D includes a directory "arm64", namely, a directory for the 64-bit OS, and does not include a directory "armeabi", namely, a directory for the 32-bit OS. The compiling device may then determine that the third-party APP D supports the 64-bit OS and does not support the 32-bit OS.

In step 4012, the compiling device may acquire the machine-code file by compiling the byte-code file of the third-party APP according to the OS supported by the third-party APP.

Optionally, by compiling a byte-code file of a third-party APP according to an OS supported by the third-party APP, it may be ensured that a terminal may extract a machine-code file corresponding to an OS carried by the terminal, thereby ensuring that the third-party APP is run normally.

Optionally, step 4012 may include steps as follows.

In step 4012*a*, when the third-party APP supports both the 32-bit OS and the 64-bit OS, the compiling device may generate a 32-bit machine-code file and a 64-bit machine-code file by compiling the byte-code file.

For a third-party APP supporting both the 32-bit OS and the 64-bit OS, the byte-code file of the third-party APP may be compiled to generate a 32-bit machine code and a 64-bit machine code, ensuring that the third-party APP may be run normally regardless of being installed on a terminal carrying the 32-bit OS or a terminal carrying the 64-bit OS.

For example, a byte-code file of a third-party APP E supporting both the 32-bit OS and the 64-bit OS may be compiled to generate a 32-bit machine-code file and a 64-bit machine-code file. The machine-code files may be stored. The third-party APP E may then be preinstalled on a terminal carrying the 32-bit OS. After the third-party APP E is successfully installed, to run the third-party APP E, the terminal may extract the 32-bit machine-code file of the third-party APP E. Alternatively, the third-party APP E may be preinstalled on a terminal carrying the 64-bit OS. After the third-party APP E is successfully installed, to run the third-party APP E, the terminal may extract the 64-bit machine-code file of the third-party APP E.

In practice, a third-party APP may be preinstalled in a terminal. After installing the third-party APP successfully, the terminal may share the third-party APP while running the third-party APP. For a third-party APP supporting both the 32-bit OS and the 64-bit OS, if the byte-code file of the third-party APP is compiled into a 32-bit machine code and a 64-bit machine code, the terminal may share the third-party APP with another terminal carrying the 32-bit OS or the 64-bit OS when sharing the third-party APP. As such, the options for sharing the third-party APP may be increased.

For example, a third-party APP F supporting both the 32-bit OS and the 64-bit OS may be installed on a terminal A carrying the 32-bit OS. A byte-code file of the third-party APP F may be compiled into a 32-bit machine code and a 64-bit machine code. The terminal A may share the third-party APP F with a terminal B carrying the 64-bit OS. The third-party APP F may be installed and run normally on the terminal B. If the byte-code file of the third-party APP F is compiled into the 32-bit machine code only, the third-party APP F may not be installed and run normally on the terminal B because the terminal B operates under the 64-bit OS.

In step 4012*b*, when the third-party APP supports the 32-bit OS and does not support the 64-bit OS, the compiling device may generate and store a 32-bit machine-code file by compiling the byte-code file.

For example, a byte-code file of a third-party APP G supporting the 32-bit OS but not the 64-bit OS may be compiled to generate a 32-bit machine-code file. The third-party APP G may then be preinstalled on a terminal carrying the 32-bit OS. After the third-party APP G is successfully installed, to run the third-party APP the terminal may extract the 32-bit machine-code file of the third-party APP G.

In step 4012*c*, when the third-party APP supports the 64-bit OS and does not support the 32-bit OS, the compiling device may generate a 64-bit machine-code file by compiling the byte-code file.

For example, a byte-code file of a third-party APP H supporting the 64-bit OS but not the 32-bit OS may be compiled to generate a 64-bit machine-code file. The third-party APP H may then be preinstalled on a terminal carrying the 64-bit OS. After the third-party APP H is successfully installed, to run the third-party APP H, the terminal may extract the 64-bit machine-code file of the third-party APP H.

Sometimes, it may be preferable to always generate the machine-code file of a third-party APP for both the 32-bit OS and 64-bit OS. For example, the OS operated on the terminal may be changed, the OS for the terminal may be upgraded from 32-bit OS to 64-bit OS, or sometimes may be downgraded from the 64-bit OS to 32-bit OS. In order to make sure the machine-code file of a third-party APP is available for both 32-bit OS and 64-bit OS, the machine-code file of a third-party APP may be generated for both the 32-bit OS and 64-bit OS no matter which OS is operated on the terminal.

Sometimes, the machine-code file of a third-party APP may be generated for multiple OSs under which the third-party APP may possibly be installed. For example, if the third-party APP can be operated on both Android phone and Apple phone, the machine-code file of the third-party APP may be generated for all Android operating systems and Mac operating systems. All generated machine-code files may be stored in the data partition of the terminal. During the first boot-up of the terminal, the system may select the suitable machine-code file to be executed for the third-party APP according to the operating system that supports the terminal.

In step 402, the compiling device stores the machine-code file in a data partition of the terminal.

Optionally, after acquiring the machine-code file by compiling the byte-code file of the third-party APP, the compiling device may store the compiled machine-code file in the data partition of the terminal. By preinstalling the third-party APP in the data partition, it may be ensured that the third-party APP may be uninstalled.

In step 403, the compiling device may store the byte-code file of the third-party APP in the data partition of the terminal.

The byte-code file may be that of the third-party APP preinstalled in the data partition of the terminal. The third-party APP preinstalled in the data partition of the terminal is to be reinstalled after an upgrade of a system of the terminal. The reinstallation may be performed during the first boot-up of the terminal after the upgrade of the system of the terminal completes. During the reinstallation, the byte-code file of the third-party APP may have to be re-extracted.

To avoid abnormality caused by failing to find the byte-code file by the terminal while first booting up and installing the third-party APP after the upgrade of the system, the compiling device may have to store, in the data partition of the terminal, the byte-code file of the third-party APP for later use during reinstallation of the third-party APP after a system upgrade. As such, the smooth installation of the third-party APP can be ensured. The compiling device may store the byte-code file of the third-party APP in the data partition of the terminal at any time, for example, the compiling device may store the byte-code file of the third-party APP before or after compiling the byte-code file of the third-party APP into the machine-code file.

Figure 2C:
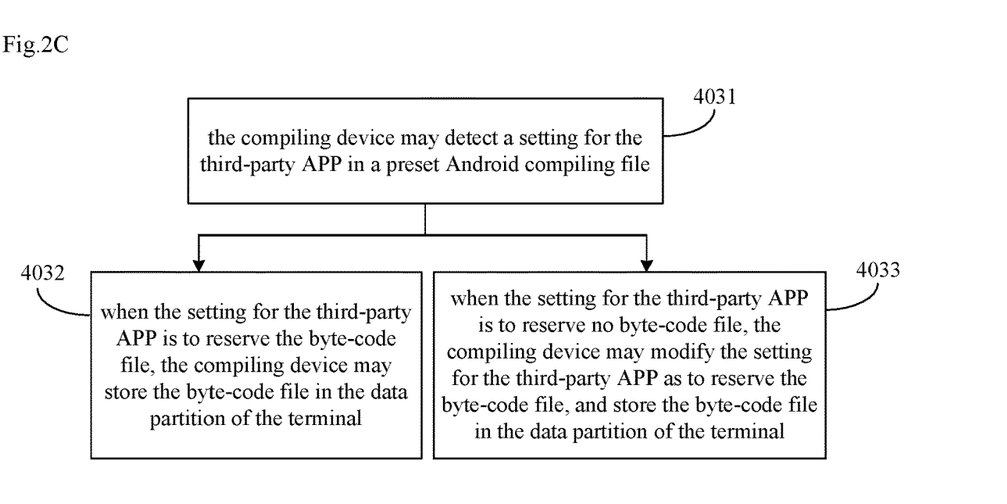
FIG. 2C is a flowchart of a method for storing a byte-code file according to an example herein.

Optionally, as shown in FIG. 2C, step 403 may include steps as follows.

In step 4031, the compiling device may detect a setting for the third-party APP in a preinstalled Android compiling file.

The preinstalled Android compiling file may be a file with a compiling function in an Android system. The preinstalled Android compiling file may be a file "Android.mk". The setting for the third-party APP may indicate whether to include the byte-code file.

In step 4032, when the setting for the third-party APP is to include the byte-code file, the compiling device may store the byte-code file in the data partition of the terminal.

For example, when a third-party APP D preinstalled in the data partition of the terminal is compiled, if a setting for the third-party APP is to include the byte-code file, the byte-code file of the third-party APP D may be stored in the data partition of the terminal after compilation completes.

In step 4033, when the setting for the third-party APP is to include no byte-code file, the compiling device may modify the setting for the third-party APP as to include the byte-code file, and store the byte-code file in the data partition of the terminal.

Optionally, the file "Android.mk" may be modified to modify the setting for the third-party APP as to include the byte-code file, such as by setting a code as follows.

LOCAL_DEX_PREOPT:=nostripping

With the code set, the byte-code file of the third-party APP will be included in the data partition of the terminal after the compiling device compiles the byte-code file into the machine-code file.

For example, to compile a third-party APP E preinstalled in the data partition of the terminal, if a setting for the third-party APP is to include no byte-code file, then the setting for the third-party APP may be modified as to include the byte-code file before the compilation, such that the byte-code file of the third-party APP E may be included in the data partition of the terminal after the compilation completes.

In step 404, when a mandatory byte-code file extracting flag exists in a preinstalled source code of a system framework, the compiling device may deactivate the mandatory byte-code file extracting flag by modifying the source code of the system framework.

The mandatory byte-code file extracting flag may inform the terminal to extract the byte-code file.

Optionally, the mandatory byte-code file extracting flag may be represented as "SCAN_FORCE_DEX". The flag "SCAN_FORCE_DEX" may be deactivated by modifying the preinstalled source code of the system framework, such that a terminal may not be forced to extract the byte-code file and neglect the compiled machine-code file while first booting up and installing a preinstalled third-party APP after the terminal leaves the factory. The source code of the system framework may be an open source code forming a system framework layer.

For example, the compiling device may set, in the data partition of the terminal, a deactivating flag. The deactivating flag may inform the terminal that the mandatory byte-code file extracting flag is deactivated.

Optionally, the deactivating flag may be set under a directory "/data/app." The deactivating flag may act as an identifier. The terminal may deactivate the mandatory byte-code file extracting flag according to an activated (i.e., effective or valid) deactivating flag. When the deactivating flag is deactivated (i.e., invalid or deleted), the mandatory byte-code file extracting flag may become activated, and the terminal may extract the byte-code file according to the mandatory byte-code file extracting flag.

In step 405, the compiling device may configure a system file in the terminal. The system file may include an installation file for installing the third-party APP.

Optionally, the compiling device may pack the system file including the installation file for installing the third-party APP into a system image file and then configure the system image file in the terminal. The installation file for installing the third-party APP may include the byte-code file and machine-code file of the third-party APP.

In step 406, the terminal may install, at the first boot-up of the terminal, the third-party APP in the data partition of the terminal.

According to an Android Runtime (ART) virtual machine used by an existing Android system, a machine-code file of a third-party APP preinstalled in a data partition of a terminal may have to be extracted from a path where the third-party APP has been installed in order to ensure that the third-party APP be run normally.

By default, a third-party APP is installed in a system partition. A machine-code file of a third-party APP preinstalled in the data partition of a terminal may have to be extracted from the data partition. Therefore, it may be set that the third-party APP is installed in the data partition to ensure consistency between an extraction path and an installation path.

It may be set to modify the Android compiling file "Android.mk" by adding a code as follows.

LOCAL_MOUDLE_PATH:=$(TARGET_OUT_DATA_APPS)

The code may instruct to install the third-party APP under a directory APP of the data partition of the terminal. That is, the third-party APP may be installed under the directory "/data/app".

In step 407, in case the third-party APP is to be run, the terminal extracts the machine-code file of the third-party APP from the data partition of the terminal.

Step 407 may include steps as follows.

In step X1, at the first boot-up of the terminal, the terminal may detect, in the data partition of the terminal, a deactivating flag.

The deactivating flag may inform the terminal that a mandatory byte-code file extracting flag is deactivated.

In step X2, the terminal may extract, according to the deactivating flag, the machine-code file of the third-party APP from the data partition of the terminal.

Since the deactivating flag may indicate that the mandatory byte-code file extracting flag is deactivated, at the first boot-up, the terminal will not extract the byte-code file of the third-party APP and perform compilation, but may directly extract the machine-code file of the third-party APP from the data partition of the terminal.

In practice, to run a third-party APP preinstalled in the terminal, the terminal may also extract a machine-code file of the third-party APP from the data partition of the terminal. For example, for a third-party APP A preinstalled in the data partition of the terminal, the terminal may install, at the first boot-up, the third-party APP A in the data partition of the terminal. After the third-party APP A is installed successfully, the terminal may extract the machine-code file of the third-party APP A from the data partition of the terminal to run the third-party APP A.

In step X3, after the machine-code file is extracted, the terminal may deactivate the deactivating flag.

In practice, the terminal may also delete the deactivating flag after extracting the machine-code file. For example, if after extracting the machine-code file, the terminal sets the deactivating flag to be invalid, that is, the deactivating flag is set to be an invalid bit, then at a boot-up after the first boot-up, before extracting the byte-code file, the terminal may have to detect the deactivating flag. The terminal may extract the byte-code file if detecting that the deactivating flag is deactivated. If the terminal deletes the deactivating flag after extracting the machine-code file, then at a boot-up after the first boot-up, the terminal may directly extract the byte-code file. The extracted byte-code file may be compiled into the machine-code file before the third party APP is executed.

In step 408, the terminal runs the machine-code file. The machine-code file is acquired by the compiling device before performing the first boot-up of the terminal, and by compiling the byte-code file of the third-party APP.

The compiling device may be a computer. In practice, the system of the terminal may be upgraded. During a first boot-up of the terminal after the upgrade of the system of the terminal, a third-party APP preinstalled in the data partition of the terminal is to be reinstalled using a method shown in FIG. 2D as follows.

Figure 2D:
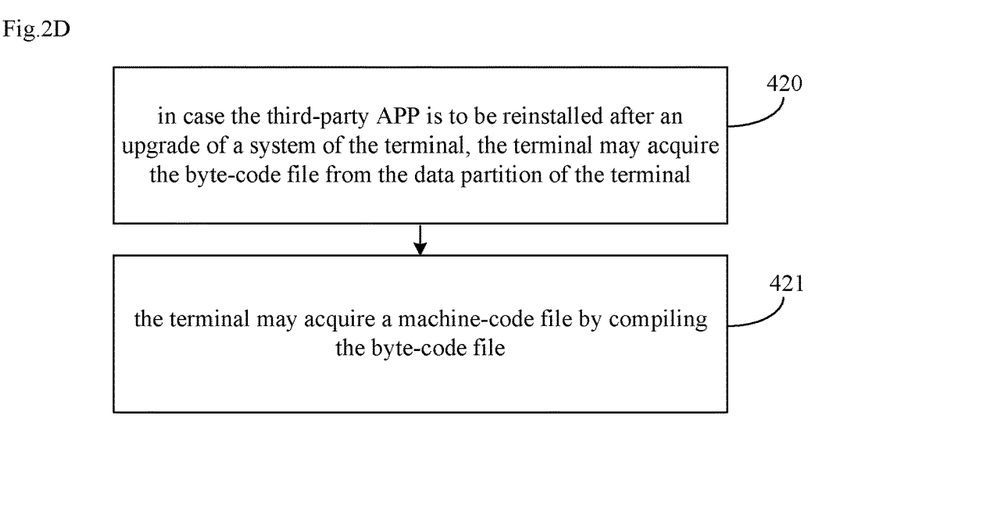
FIG. 2D is a flowchart of a method for reinstalling a preinstalled third-party APP according to an example herein.

In step 420, in case the third-party APP is to be reinstalled after an upgrade of a system of the terminal, the terminal may acquire the byte-code file from the data partition of the terminal.

In practice, a file in the data partition in general is not affected by the upgrade. Particularly, the file is part of a third party APP. Therefore, during a first boot-up of the terminal after each upgrade of the system of the terminal, a third-party APP preinstalled in the data partition may have to be reinstalled, during which the byte-code file of the third-party APP may have to be re-acquired and then step 421 may have to be executed.

Sometimes, after the system upgrade, the compilation for third-party APPs may be scheduled to be done at a certain time after the system upgrade is completed. For example, rather than reinstalling the third-party APPs during a first boot-up of the terminal after the system upgrade is performed, the third-party APPs may be scheduled to be recompiled at 2 am using the byte-code files of the third-party APPs on the day after the system upgrade is completed. By this way, the recompilation does not need to be performed during the first boo-up of the terminal after the system upgrade. Because, in general, the terminal may not be used at 2 am, the recompilation may not affect the use of the terminal.

In step 421, the terminal may acquire a machine-code file by compiling the byte-code file.

Optionally, the byte-code file may be compiled into the machine-code file, such that the third-party APP may be smoothly run later.

To sum up, with the method for executing a file according to an example herein, to run a preinstalled third-party APP, a machine-code file of the third-party APP compiled before a first boot-up of a terminal may be extracted from a data partition. Thus, a duration of the first boot-up of the terminal may be reduced and the first boot-up of the terminal may be speeded up.

Note that steps of a method for executing a file according to an example herein may be carried out in different sequences, and may or may not include a specific step as needed. For example, step 403 may be executed before step 401 as long as the byte-code file of the third-party APP is included in the data partition after the compiling device compiles the byte-code file of the third-party APP into the machine-code file. When step 403 is executed before step 401, the byte-code file of the third-party APP may be copied in the data partition, such that two copies of the byte-code file of the third-party APP may exist in the data partition. The compiling device may then compile one of the two copies of the byte-code file of the third-party APP into the machine-code file. After the compilation, the byte-code file of the third-party APP is still stored in the data partition.

Any modification or replacement, as is easily thought of by those skilled in the art, and falls within the technical scope disclosed herein, shall fall within the protection scope of the present disclosure, and therefore is not repeated and elaborated.

Figure 3A:
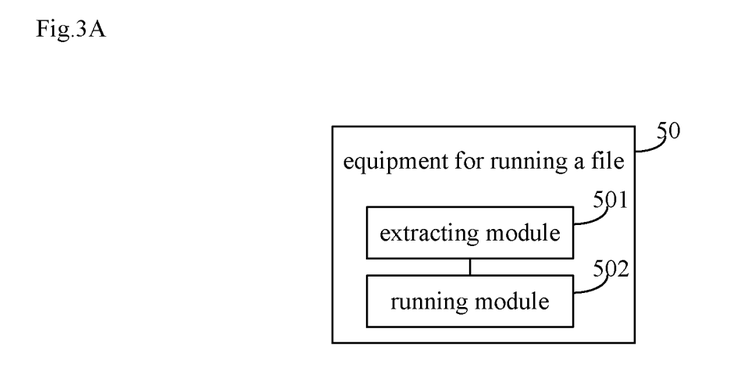
FIG. 3A is a block diagram of equipment for executing a file according to an example herein.

FIG. 3A is a block diagram of equipment for executing a file 50 according to an example herein. Referring to FIG. 3A, the equipment for executing a file 50 may include:

An extracting module 501 configured for: in case a third-party Application (APP) preinstalled in a terminal is to be run, extracting a machine-code file of the third-party APP from a data partition of the terminal; and A running module 502 configured for: running the machine-code file. The machine-code file is acquired by a compiling device before a first boot-up of the terminal is performed, and by compiling a byte-code file of the third-party APP.

To sum up, with the equipment for executing a file according to an example herein, to run a preinstalled third-party APP, the extracting module may extract, from a data partition, a machine-code file of the third-party APP compiled before a first boot-up of a terminal is performed, the running module may execute the machine-code file, reduce a duration of the first boot-up of the terminal, speed up the first boot-up of the terminal. The equipment described herein may be a device such as a mobile handset or the like.

Optionally, the extracting module 501 may be configured as follows.

The extracting module may be configured for, at the first boot-up of the terminal, detecting, in the data partition of the terminal, a deactivating flag. The deactivating flag may inform the terminal that a mandatory byte-code file extracting flag is deactivated.

The extracting module may be configured for extracting, according to the deactivating flag, the machine-code file of the third-party APP from the data partition of the terminal.

The extracting module may be configured for, after the machine-code file is extracted, deactivating the deactivating flag.

Figure 3B:
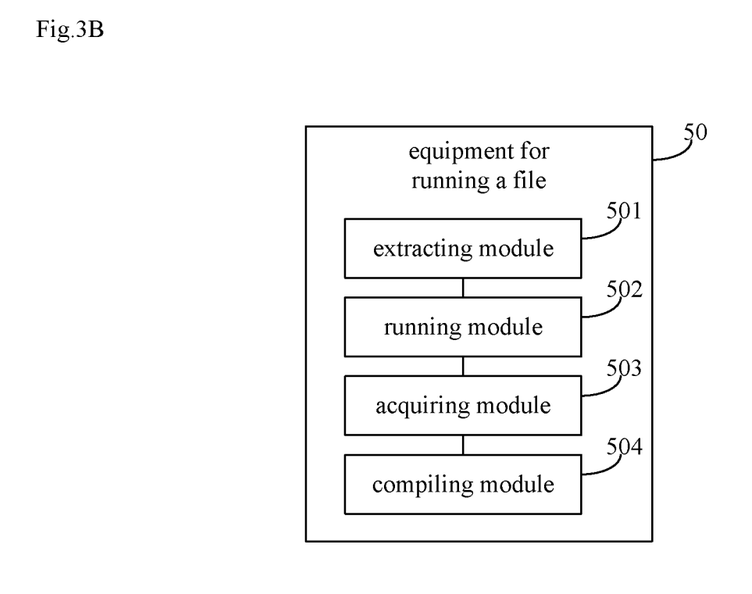
FIG. 3B is a block diagram of equipment for executing a file according to another example herein.

FIG. 3B is a block diagram of equipment for executing a file 50 according to another example herein. Referring to FIG. 3B, the equipment for executing a file 50 may include: an extracting module 501, a running module 502, an acquiring module 503, and a compiling module 504.

The extracting module 501 is configured for: in case a third-party Application (APP) preinstalled in a terminal is to be run, extracting a machine-code file of the third-party APP from a data partition of the terminal.

The running module 502 is configured for: executing the machine-code file. The machine-code file is acquired by a compiling device before a first boot-up of the terminal is performed, and by compiling a byte-code file of the third-party APP.

The acquiring module 503 may be configured for: in case the third-party APP is to be reinstalled after conducting an upgrade of a system of the terminal, acquiring the byte-code file from the data partition of the terminal.

The compiling module 504 may be configured for: acquiring a machine-code file by compiling the byte-code file.

The byte-code file may be pre-stored in the data partition of the terminal by the compiling device.

Figure 3C:
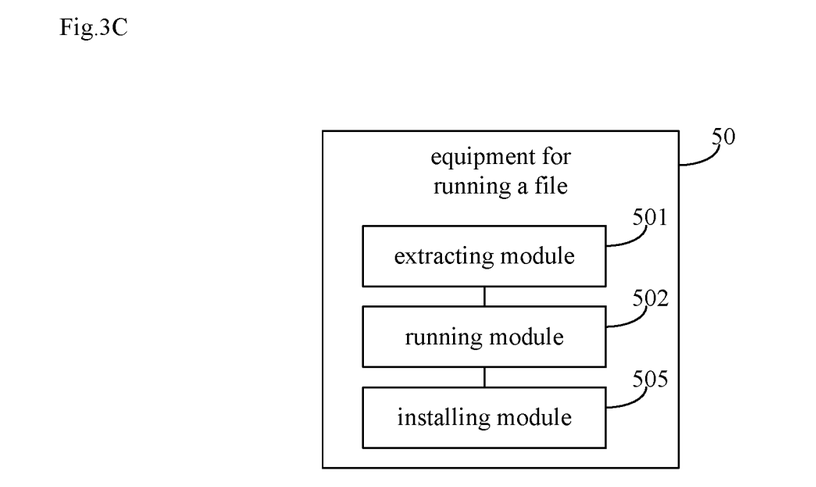
FIG. 3C is a block diagram of equipment for executing a file according to a further example herein.

FIG. 3C is a block diagram of equipment for executing a file 50 according to a further example herein. Referring to FIG. 3C, the equipment for executing a file 50 may include: an extracting module 501, a running module 502, and an installing module 505.

The extracting module 501 is configured for: in case a third-party Application (APP) preinstalled in a terminal is to be run, extracting a machine-code file of the third-party APP from a data partition of the terminal.

The running module 502 is configured for: executing the machine-code file. The machine-code file is acquired by a compiling device before a first boot-up of the terminal is performed, and by compiling a byte-code file of the third-party APP.

The installing module 505 may be configured for: installing, at the first boot-up of the terminal, the third-party APP in the data partition of the terminal.

To sum up, with the equipment for executing a file according to an example herein, to run a preinstalled third-party APP, the extracting module may extract, from a data partition, a machine-code file of the third-party APP compiled before a first boot-up of a terminal is performed. The running module may execute the machine-code file. As such, a duration of the first boot-up of the terminal may be reduced, and the first boot-up of the terminal may be speeded up.

Figure 4A:
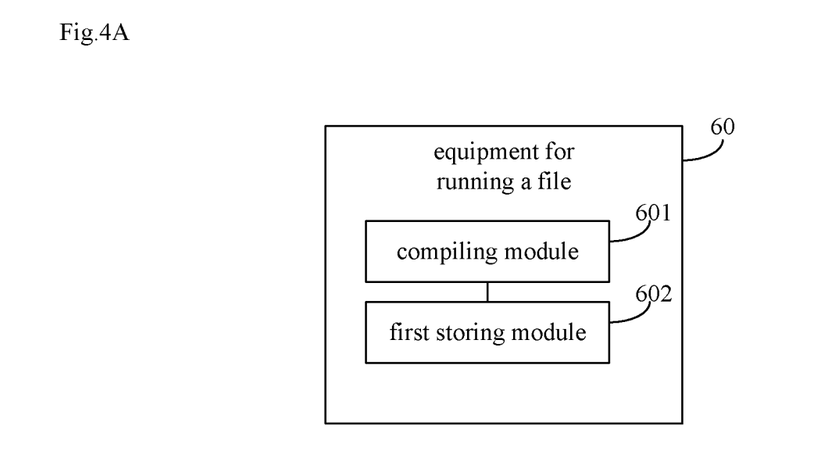
FIG. 4A is a block diagram of equipment for executing a file according to yet another example herein.

FIG. 4A is a block diagram of equipment for executing a file according to yet another example herein 60. Referring to FIG. 4A, the equipment for executing a file 60 may include:

A compiling module 601 configured for: acquiring, before a first boot-up of a terminal, a machine-code file by compiling a byte-code file of a third-party Application (APP); and A first storing module 602 configured for: storing the machine-code file in a data partition of the terminal.

To sum up, with the equipment for executing a file according to yet another example herein, the compiling module acquires a machine-code file by compiling a byte-code file of a third-party APP before a first boot-up of a terminal, a step of compiling the byte-code file into the machine-code file may be skipped during the first boot-up of the terminal. Thus, a duration of the first boot-up of the terminal is reduced, the first boot-up of the terminal is speeded up.

Figure 4B:
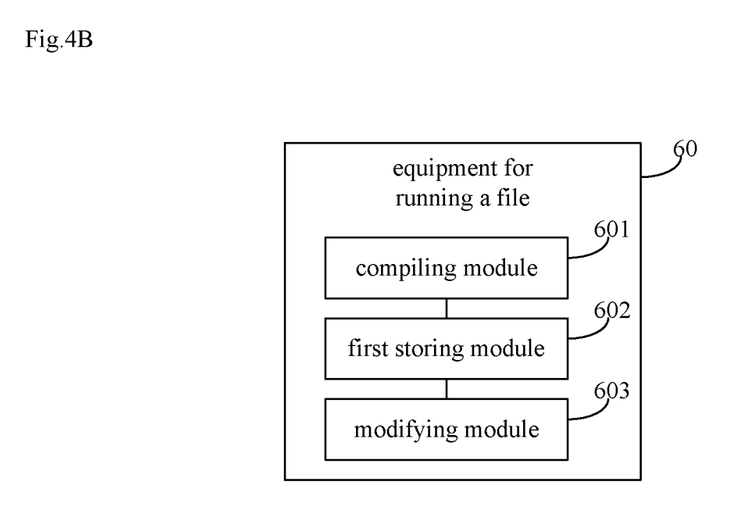
FIG. 4B is a block diagram of equipment for executing a file according to yet a further example herein.

FIG. 4B is a block diagram of equipment for executing a file according to yet a further example herein 60. Referring to FIG. 4B, the equipment for executing a file 60 may include: a compiling module 601, a first storing module 602, and a modifying module 603.

The compiling module 601 may be configured for: acquiring, before a first boot-up of a terminal, a machine-code file by compiling a byte-code file of a third-party Application (APP).

The first storing module 602 may be configured for: storing the machine-code file in a data partition of the terminal.

The modifying module 603 may be configured for: when a mandatory byte-code file extracting flag exists in a preinstalled source code of a system framework, deactivating the mandatory byte-code file extracting flag by modifying the source code of the system framework.

The mandatory byte-code file extracting flag may inform the terminal to extract the byte-code file.

Optionally, the modifying module 603 may also be configured for: setting, in the data partition of the terminal, a deactivating flag. The deactivating flag may inform the terminal that the mandatory byte-code file extracting flag is deactivated.

Figure 4C:
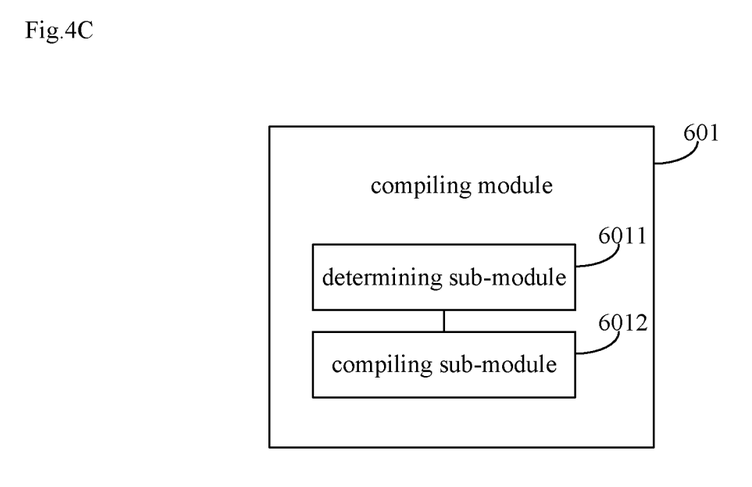
FIG. 4C is a block diagram of a compiling module according to an example herein.

FIG. 4C is a block diagram of a compiling module according to yet a further example herein 601. Referring to FIG. 4C, the compiling module 601 may include:

A determining sub-module 6011 configured for: determining an operating system (OS) supported by the third-party APP; and A compiling sub-module 6012 configured for: acquiring the machine-code file by compiling the byte-code file of the third-party APP according to the OS supported by the third-party APP.

Optionally, the compiling sub-module 6012 may be configured for:

When the third-party APP supports both the 32-bit OS and the 64-bit OS, a 32-bit machine-code file and a 64-bit machine-code file is acquired by compiling the byte-code file.

When the third-party APP supports the 32-bit OS and does not support the 64-bit OS, a 32-bit machine-code file is acquired by compiling the byte-code file.

Or alternatively, when the third-party APP supports the 64-bit OS and does not support the 32-bit OS, a 64-bit machine-code file is acquired by compiling the byte-code file.

Optionally, the determining sub-module 6011 may be configured for:

Detecting whether an unzipped installation package corresponding to the third-party APP includes a directory for a 32-bit OS and whether the unzipped installation package corresponding to the third-party APP includes a directory for a 64-bit OS;

When the unzipped installation package includes both the directory for the 32-bit OS and the directory for the 64-bit OS, determining that the third-party APP supports both the 32-bit OS and the 64-bit OS;

When the unzipped installation package includes the directory for the 32-bit OS and does not include the directory for the 64-bit OS, determining that the third-party APP supports the 32-bit OS and does not support the 64-bit OS; or When the unzipped installation package includes the directory for the 64-bit OS and does not include the directory for the 32-bit OS, determining that the third-party APP supports the 64-bit OS and does not support the 32-bit OS.

Figure 4D:
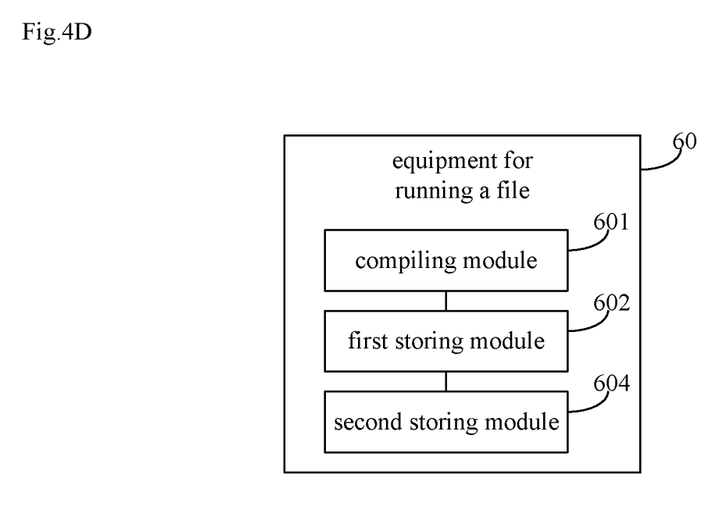
FIG. 4D is a block diagram of equipment with different components for executing a file according to an example herein.

FIG. 4D is a block diagram of equipment with different components for executing a file according to an example herein 60. Referring to FIG. 4D, the equipment for executing a file 60 may include: a compiling module 601, a first storing module 602, and a second storing module 604.

The compiling module 601 may be configured for: acquiring, before a first boot-up of a terminal, a machine-code file by compiling a byte-code file of a third-party Application (APP).

The first storing module 602 may be configured for: storing the machine-code file in a data partition of the terminal.

The second storing module 604 may be configured for: storing the byte-code file in the data partition of the terminal.

Optionally, the second storing module 604 may be configured for:

Detecting a setting for the third-party APP in a preinstalled Android compiling file;

When the setting for the third-party APP is to include the byte-code file, storing the byte-code file in the data partition of the terminal; and When the setting for the third-party APP is to include no byte-code file, modifying the setting for the third-party APP as to include the byte-code file, and storing the byte-code file in the data partition of the terminal.

To sum up, with the equipment for executing a file according to an example herein, the compiling module acquires a machine-code file by compiling a byte-code file of a third-party APP before a first boot-up of a terminal, a step of compiling the byte-code file into the machine-code file may be skipped during the first boot-up of the terminal. As such, a duration of the first boot-up of the terminal is reduced, and the first boot-up of the terminal is speeded up.

The way in which a module of the equipment in an aforementioned example executes an operation has been elaborated in an aforementioned example of the method, and will not be elaborated here.

Correspondingly, according to an example herein, equipment for executing a file, which may apply to a terminal shown in FIG. 1A, includes:

A processor; and

A memory configured for storing an instruction executable for the processor.

The processor may be configured for:

In case a third-party Application (APP) preinstalled in a terminal is to be run, extracting a machine-code file of the third-party APP from a data partition of the terminal; and Executing the machine-code file.

The machine-code file is acquired by a compiling device before a first boot-up of the terminal, by compiling a byte-code file of the third-party APP.

According to an example herein, equipment for executing a file, which may apply to a compiling device shown in FIG. 1A, includes:

A processor; and

A memory configured for storing an instruction executable for the processor.

The processor may be configured for:

Acquiring, before a first boot-up of a terminal, a machine-code file by compiling a byte-code file of a third-party Application (APP); and Storing the machine-code file in a data partition of the terminal.

Figure 5:
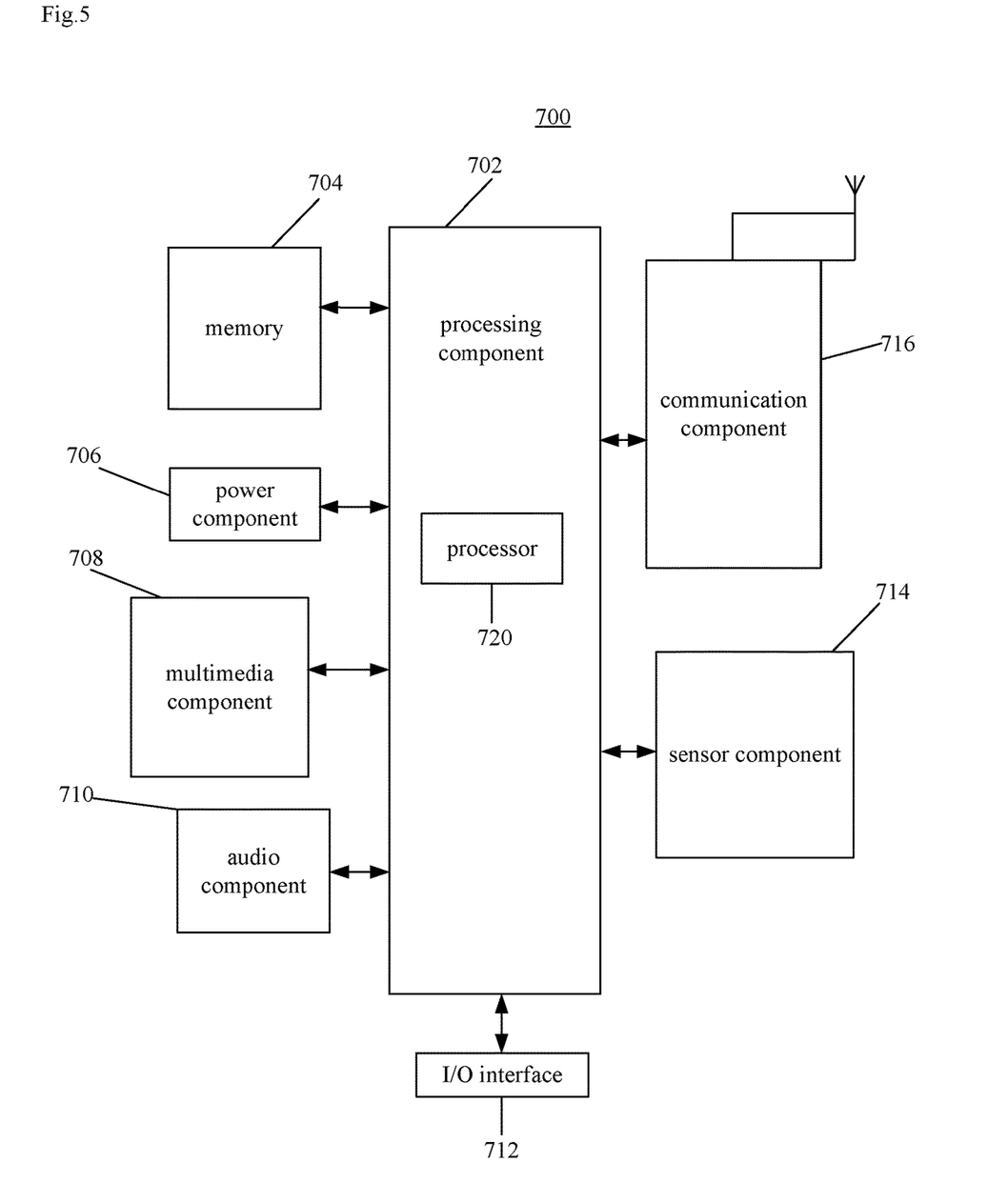
FIG. 5 is a block diagram of equipment with example components for executing a file according to an example herein.

FIG. 5 is a block diagram of equipment with example components for executing a file according to an example herein 700. The equipment 700 may be a terminal. For example, the equipment 700 may be a mobile terminal, such as a mobile phone, a digital broadcast terminal, a gaming console, tablet equipment, medical equipment, fitness equipment, a Personal Digital Assistant, etc. The equipment may also be a compiling device. For example, the equipment 700 may be provided as a computer or a processor.

For example, referring to FIG. 5, the equipment 700 may include one or more components as follows: a processing component 702, a memory 704, a power component 706, a multimedia component 708, an audio component 710, an Input/Output (I/O) interface 712, a sensor component 714, and a communication component 716.

The processing component 702 generally controls an overall operation of the equipment 700, such as operations associated with display, a telephone call, data communication, a camera operation, and a recording operation. The processing component 702 may include one or more processors 720 to execute instructions so as to complete all or some steps of the method. In addition, the processing component 702 may include one or more modules to facilitate interaction between the processing component 702 and other components. For example, the processing component 702 may include a multimedia module to facilitate interaction between the multimedia component 708 and the processing component 702.

The memory 704 may be configured for storing various types of data to support the operation on the equipment 700. Example of such data may include instructions of any application or method configured for operating on the equipment 700, contact data, phonebook data, messages, pictures, videos, and/or the like. The memory 704 may be realized by any type of volatile or non-transitory storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 706 may supply electric power to various components of the equipment 700. The power component 706 may include a power management system, one or more power sources, and other components related to generating, managing and distributing electricity for the equipment 700.

The multimedia component 708 may include a screen providing an output interface between the equipment 700 and a user. In some examples, the screen may include a Liquid Crystal Display (LCD) and a Touch Panel (TP). If the screen includes a TP, the screen may be realized as a touch screen to receive an input signal from a user. The TP may include one or more touch sensors for sensing touch, slide and gestures on the TP. The touch sensors not only may sense the boundary of a touch or slide move, but also detect the duration and pressure related to the touch or slide move. In some examples, the multimedia component 708 may include a front camera and/or a rear camera. When the equipment 700 is in an operation mode such as a shooting mode or a video mode, the front camera and/or the rear camera may receive external multimedia data. Each of the front camera and the rear camera may be a fixed optical lens system or may have a focal length and be capable of optical zooming.

The audio component 710 may be configured for outputting and/or inputting an audio signal. For example, the audio component 710 may include a microphone (MIC). When the equipment 700 is in an operation mode such as a call mode, a recording mode, and a voice recognition mode, the MIC may be configured for receiving an external audio signal. The received audio signal may be further stored in the memory 704 or may be sent via the communication component 716. In some examples, the audio component 710 may further include a loudspeaker configured for outputting the audio signal.

The I/O interface 712 may provide an interface between the processing component 702 and a peripheral interface module. Such a peripheral interface module may be a keypad, a click wheel, a button or the like. Such a button may include but is not limited to: a homepage button, a volume button, a start button, and a lock button.

The sensor component 714 may include one or more sensors for assessing various states of the equipment 700. For example, the sensor component 714 may detect an on/off state of the equipment 700 and relative positioning of components such as the display and the keypad of the equipment 700. The sensor component 714 may further detect a change in the position of the equipment 700 or of a component of the equipment 700, whether there is contact between the equipment 700 and a user, the orientation or acceleration/deceleration of the equipment 700, and a change in the temperature of the equipment 700. The sensor component 714 may include a proximity sensor configured for detecting existence of a nearby object without physical contact. The sensor component 714 may further include an optical sensor such as a Complementary Metal-Oxide-Semiconductor (CMOS) or Charge-Coupled-Device (CCD) image sensor used in an imaging application. In some examples, the sensor component 714 may further include an acceleration sensor, a gyroscope sensor, a magnetic sensor, a pressure sensor, or a temperature sensor.

The communication component 716 may be configured for facilitating wired or wireless communication between the equipment 700 and other equipment. The equipment 700 may access a wireless network based on a communication standard such as WiFi, 2G or 3G, or combination thereof. In an exemplary example, the communication component 716 may receive a broadcast signal or broadcast related information from an external broadcast management system via a broadcast channel. In an exemplary example, the communication component 716 may further include a Near Field Communication (NFC) module for short-range communication. For example, the NFC module may be based on Radio Frequency Identification (RFID), Infrared Data Association (IrDA), Ultra-Wideband (UWB) technology, Bluetooth (BT), and other technologies.

In an exemplary example, the equipment 700 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components to implement the method.

In an exemplary example, a non-transitory computer-readable storage medium including instructions, such as a memory 704 including instructions, may be provided. The instructions may be executed by the processor 720 of the equipment 700 to implement the method. For example, the non-transitory computer-readable storage medium may be a Read-Only Memory (ROM), a Compact Disc Read-Only Memory (CD-ROM), a magnetic tape, a floppy disk, optical data storage equipment, and the like.

When the equipment 700 is a terminal, the equipment 700 provides a non-transitory computer-readable storage medium including an instruction, which when executed by the processor of the equipment 700, allows the equipment 700 to execute a method for executing a file according to an example herein. The method may include at least that:

In case a third-party APP preinstalled in a terminal is to be run, a machine-code file of the third-party APP is extracted from a data partition of the terminal; and The machine-code file is executed. The machine-code file is acquired by a compiling device before performing a first boot-up of the terminal, and by compiling a byte-code file of the third-party APP.

When the equipment 700 is a compiling device, the equipment 700 provides a non-transitory computer-readable storage medium including an instruction, which when executed by the processor of the equipment 700, allows the equipment 700 to execute a method for executing a file according to an example herein. The method may include at least that:

A machine-code file is acquired before a first boot-up of a terminal by compiling a byte-code file of a third-party APP; and The machine-code file is stored in a data partition of the terminal.

According to one aspect herein, a method for executing a file of a third-party Application (APP) preinstalled in a terminal is provided. The method may include: before a first boot-up of the terminal is performed, compiling a byte-code file of the third-party APP preinstalled in the terminal using a compiling device to acquire a machine-code file; upon a request to run the third-party APP, extracting a machine-code file of the third-party APP from a data partition of the terminal; and executing the machine-code file to respond to the request to run the third-party APP.

According to another aspect herein, a device for executing a file of a third-party Application (APP) preinstalled in a terminal is provided. The device may include: a processor; and a memory configured for storing an instruction that is executable by the processor, wherein the processor may be configured for: before a first boot-up of the terminal is performed, compiling a byte-code file of the third-party APP preinstalled in the terminal using a compiling device to acquire a machine-code file; upon a request to run the third-party APP, extracting a machine-code file of the third-party APP from a data partition of the terminal; and executing the machine-code file to respond to the request to run the third-party APP.

According to an additional aspect herein, a non-transitory computer-readable storage medium having stored therein instructions is provided. The instructions, when executed by a processor, may cause the processor to perform executing a file of a third-party Application (APP) preinstalled in a terminal, where executing the file: before a first boot-up of the terminal is performed, compiling a byte-code file of the third-party APP preinstalled in the terminal using a compiling device to acquire a machine-code file; upon a request to run the third-party APP, extracting a machine-code file of the third-party APP from a data partition of the terminal; and executing the machine-code file to respond to the request to run the third-party APP.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples herein will be apparent to those skilled in the art from consideration of the specification and practice of the invention disclosed here. This application is intended to cover any variations, uses, or adaptations of the disclosure following the general principles thereof and including such departures from Examples herein as come within known or customary practice in the art. The specification and the examples are intended to be exemplary only, with a true scope and spirit of the disclosure being indicated by the appended claims.

Note that Examples herein is not limited to the exact construction that has been described above and illustrated in the accompanying drawings, and that various modifications and changes can be made without departing from the scope thereof.

What is claimed is:

1. A method for executing a file of a third-party Application (APP) preinstalled in a terminal, comprising:
   at a first boot-up of the terminal, upon a request to run a third-party APP preinstalled in the terminal, detecting a deactivating flag for informing the terminal that a mandatory byte-code file extracting flag is deactivated, indicating the mandatory byte-code file extracting flag to inform the terminal to extract a byte-code file of the third-party APP;
   extracting, according to the deactivating flag, a machine-code file of the third-party APP from a data partition of the terminal; and
   executing the machine-code file,
   wherein before the first boot-up of the terminal is performed, the machine-code file is acquired by a compiling device by compiling the byte-code file of the third-party APP, and is stored in the data partition of the terminal,
   wherein the byte-code file is pre-stored in the data partition of the terminal.

2. The method according to claim 1, further comprising:
   upon receiving an indication that the third-party APP is to be reinstalled after an upgrade of a system of the terminal is performed, acquiring the byte-code file from the data partition of the terminal; and
   acquiring a machine-code file by compiling the byte-code file.

3. The method according to claim 1, further comprising installing, at the first boot-up of the terminal, the third-party APP in the data partition of the terminal.

4. The method according to claim 1, wherein acquiring the machine-code file by compiling the byte-code file of the third-party APP comprises:
   determining an operating system (OS) supported by the third-party APP; and
   acquiring the machine-code file by compiling the byte-code file of the third-party APP according to the OS supported by the third-party APP.

5. The method according to claim 4, wherein the OS supported by the third-party APP comprises a 32-bit OS and a 64-bit OS, wherein acquiring the machine-code file by compiling the byte-code file of the third-party APP according to the OS supported by the third-party APP comprises:
   when the third-party APP supports both the 32-bit OS and the 64-bit OS, acquiring a 32-bit machine-code file and a 64-bit machine-code file by compiling the byte-code file;
   when the third-party APP supports the 32-bit OS and does not support the 64-bit OS, acquiring a 32-bit machine-code file by compiling the byte-code file; or
   when the third-party APP supports the 64-bit OS and does not support the 32-bit OS, acquiring a 64-bit machine-code file by compiling the byte-code file.

6. The method according to claim 4, wherein determining the OS supported by the third-party APP comprises:
   detecting whether an unzipped installation package corresponding to the third-party APP comprises a directory for a 32-bit OS and whether the unzipped installation package corresponding to the third-party APP comprises a directory for a 64-bit OS;
   when the unzipped installation package comprises both the directory for the 32-bit OS and the directory for the 64-bit OS, determining that the third-party APP supports both the 32-bit OS and the 64-bit OS;
   when the unzipped installation package comprises the directory for the 32-bit OS and does not comprise the directory for the 64-bit OS, determining that the third-party APP supports the 32-bit OS and does not support the 64-bit OS; or
   when the unzipped installation package comprises the directory for the 64-bit OS and does not comprise the directory for the 32-bit OS, determining that the third-party APP supports the 64-bit OS and does not support the 32-bit OS.

7. A device for executing a file of a third-party Application (APP) preinstalled in a terminal, comprising:
a processor; and
a memory configured for storing an instruction that is executable by the processor,
wherein the processor is configured for:
at a first boot-up of the terminal, upon a request to run a third-party APP preinstalled in the terminal, detecting a deactivating flag for informing the terminal that a mandatory byte-code file extracting flag is deactivated, indicating the mandatory byte-code file extracting flag to inform the terminal to extract a byte-code file of the third-party APP;
extracting, according to the deactivating flag, a machine-code file of the third-party APP from the data partition of the terminal; and
executing the machine-code file,
wherein before the first boot-up of the terminal is performed, the machine-code file is acquired by a compiling device by compiling the byte-code file of the third-party APP, and is stored in the data partition of the terminal,
wherein the byte-code file is pre-stored in the data partition of the terminal.

8. The device according to claim 7, wherein the processor is further configured for:
pre-storing the byte-code file in the data partition of the terminal;
upon receiving an indication that the third-party APP is to be reinstalled after an upgrade of a system of the terminal is performed, acquiring the byte-code file from the data partition of the terminal; and
acquiring a machine-code file by compiling the byte-code file.

9. The device according to claim 7, wherein the processor is further configured for: installing, at the first boot-up of the terminal, the third-party APP in the data partition of the terminal.

10. The device according to claim 7, wherein the machine-code file is acquired:
determining an operating system (OS) supported by the third-party APP; and
acquiring the machine-code file by compiling the byte-code file of the third-party APP according to the OS supported by the third-party APP.

11. A non-transitory computer-readable storage medium having stored therein instructions that, when executed by a processor, cause the processor to perform executing a file of a third-party Application (APP) preinstalled in a terminal, wherein executing the file comprises:
at a first boot-up of the terminal, upon a request to run a third-party APP preinstalled in the terminal, detecting a deactivating flag for informing the terminal that a mandatory byte-code file extracting flag is deactivated, indicating the mandatory byte-code file extracting flag to inform the terminal to extract a byte-code file of the third-party APP;
extracting, according to the deactivating flag, a machine-code file of the third-party APP from the data partition of the terminal; and
executing the machine-code file,
wherein before the first boot-up of the terminal is performed, the machine-code file is acquired by a compiling device by compiling the byte-code file of the third-party APP, and is stored in the data partition of the terminal,
wherein the byte-code file is pre-stored in the data partition of the terminal.

12. The non-transitory computer-readable storage medium according to claim 11, wherein the instructions further cause the processor to perform:
upon receiving an indication that the third-party APP is to be reinstalled after an upgrade of a system of the terminal is performed, acquiring the byte-code file from the data partition of the terminal; and
acquiring a machine-code file by compiling the byte-code file.

13. The method according to claim 1, further comprising:
deactivating the deactivating flag, after the machine-code file is executed.

14. The method according to claim 1, further comprising:
copying the byte-code file of the third-party APP and saving two copies of the byte-code file in the data partition of the terminal; and
compiling one of the two copies of the byte-code file into the machine-code file.

* * * * *